United States Patent
Guo et al.

(10) Patent No.: US 9,505,134 B2
(45) Date of Patent: Nov. 29, 2016

(54) LOWER ROBOTIC ARM ASSEMBLY HAVING A PLURALITY OF TENDON DRIVEN DIGITS

(71) Applicants: GM GLOBAL TECHNOLOGY OPERATIONS LLC, Detroit, MI (US); The United States of America As Represented by the Administrator of the National Aeronautics and Space Administration, Washington, DC (US)

(72) Inventors: Raymond Guo, Seabrook, TX (US); Lyndon Bridgwater, Friendswood, TX (US); Vienny Nguyen, Houston, TX (US); Nicolaus A. Radford, Kemah, TX (US)

(73) Assignees: GM Global Technology Operations LLC, Detroit, MI (US); The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 14/689,721

(22) Filed: Apr. 17, 2015

(65) Prior Publication Data

US 2015/0298319 A1 Oct. 22, 2015

Related U.S. Application Data

(60) Provisional application No. 61/982,067, filed on Apr. 21, 2014.

(51) Int. Cl.
*B25J 15/10* (2006.01)
*B25J 15/00* (2006.01)
(Continued)

(52) U.S. Cl.
CPC ............ *B25J 15/0009* (2013.01); *B25J 9/104* (2013.01); *B25J 13/084* (2013.01); *B25J 19/04* (2013.01); *Y10S 901/39* (2013.01)

(58) Field of Classification Search
CPC .. B25J 13/082; B25J 13/084; B25J 15/0009; B25J 15/0233; B25J 15/10; B25J 15/103; B25J 9/104; B25J 19/023; B25J 19/04; A61F 2/586; Y10S 901/38; Y10S 901/39; Y10S 901/46; Y10S 901/47
USPC .................................................. 294/111, 907
See application file for complete search history.

(56) References Cited

U.S. PATENT DOCUMENTS 3,694,021 A * 9/1972 Mullen .................. A61F 2/583
 294/106
5,447,403 A * 9/1995 Engler, Jr. .......... B25J 15/0009
 294/111

(Continued)

FOREIGN PATENT DOCUMENTS

EP 0 045 818 * 5/1985

*Primary Examiner* — Dean Kramer
(74) *Attorney, Agent, or Firm* — Quinn Law Group, PLLC

(57) ABSTRACT

A lower robotic arm includes a base structure, a plurality of digits, and a plurality of tendons. The digits each include first, second, third, and fourth phalanges. Each digit is operatively attached to the base structure at the respective first phalange. A first joint operatively connects the first and second phalange to define a first axis, a second operatively connects the second and third phalange to define a second axis, and a third joint operatively connects the third and fourth phalange to define a third axis, such that the phalanges are selectively rotatable relative to the adjacent phalange, about the respective axis. The tendons are operatively connected to a respective one of the fourth phalanges. Each tendon selectively applies a first torque to the respective fourth phalange to urge the respective phalanges to rotate in a first direction about the respective axes.

20 Claims, 11 Drawing Sheets

(51) Int. Cl.
   *B25J 9/10*   (2006.01)
   *B25J 19/04*  (2006.01)
   *B25J 13/08*  (2006.01)

(56) References Cited

U.S. PATENT DOCUMENTS

| | | | |
|---|---|---|---|
| 7,296,835 B2 * | 11/2007 | Blackwell | B25J 9/104 294/106 |
| 8,291,788 B2 | 10/2012 | Ihrke et al. | |
| 8,424,941 B2 | 4/2013 | Ihrke et al. | |
| 8,467,903 B2 | 6/2013 | Ihrke et al. | |
| 8,489,239 B2 | 7/2013 | Abdallah et al. | |
| 8,511,964 B2 | 8/2013 | Linn et al. | |
| 8,562,049 B2 | 10/2013 | Ihrke et al. | |
| 8,573,663 B1 * | 11/2013 | Lin | B25J 15/0009 294/106 |
| 8,618,762 B2 | 12/2013 | Reiland et al. | |
| 2005/0121929 A1 * | 6/2005 | Greenhill | B25J 15/0009 294/106 |
| 2006/0145495 A1 * | 7/2006 | Fang | B25J 15/0009 294/106 |
| 2009/0025502 A1 | 1/2009 | Nakamoto | |

* cited by examiner

LOWER ROBOTIC ARM ASSEMBLY HAVING A PLURALITY OF TENDON DRIVEN DIGITS

CROSS-REFERENCE TO RELATED APPLICATIONS

This application claims the benefit of U.S. Provisional Patent Application No. 61/982,067 filed on Apr. 21, 2014, which is hereby incorporated by reference in its entirety.

STATEMENT REGARDING FEDERALLY SPONSORED RESEARCH OR DEVELOPMENT

This invention was made with government support under NASA Space Act Agreement number SAA-AT-07-003. The government may have certain rights in the invention.

TECHNICAL FIELD

The present invention relates to a lower robotic arm assembly having a plurality of tendon driven digits.

BACKGROUND OF THE INVENTION

Typical robots are automated devices that are able to manipulate objects using a series of rigid links, which in turn are interconnected via articulations or motor-driven robotic joints. Each joint in a typical robot represents an independent control variable, also referred to as a degree of freedom (DOF). End-effectors are the particular links used for performing a task at hand, e.g., grasping a work tool or an object. Therefore, precise motion control of a robot may be organized by the level of task specification: object level control, i.e., the ability to control the behavior of an object held in a single or cooperative grasp of a robot, end-effector control, and joint level control. Collectively, the various control levels cooperate to achieve the required robotic mobility, dexterity, and work task-related functionality.

Humanoid robots in particular are robots having an approximately human structure or appearance, whether a full body, a torso, and/or an appendage, with the structural complexity of the humanoid robot being largely dependent upon the nature of the work task being performed. The use of humanoid robots may be preferred where direct interaction is required with devices or systems that are specifically made for human use. Due to the wide spectrum of work tasks that may be expected of a humanoid robot, different control modes may be simultaneously required. For example, precise control must be applied within the different spaces noted above, as well as control over the applied torque or force, motion, and the various grasp types.

SUMMARY

One aspect of the disclosure provides a lower robotic arm including a base structure, a plurality of digits, and a plurality of tendons. The digits each include a first, second, third, and fourth phalange. A first joint operatively connects the first phalange to the second phalange such that the second phalange is selectively rotatable with respect to the first phalange about a first axis. A second joint operatively connects the second phalange to the third phalange such that the third phalange is selectively rotatable with respect to the second phalange about a second axis. A third joint operatively connects the third phalange to the fourth phalange such that the fourth phalange is selectively rotatable with respect to the third phalange about a third axis. One of the tendons is operatively connected to a respective one of the fourth phalanges. Each tendon is configured to selectively apply a first torque to the respective fourth phalange to urge the fourth phalange to rotate in a first direction about the third axis, relative to the respective third phalange.

Another aspect of the disclosure provides a lower robotic arm including a forearm, a wrist joint assembly, and a hand. The wrist joint assembly movably interconnects the hand to the forearm to allow movement of the hand, relative to the forearm. The hand includes a plurality of digits that provide 13 degrees of freedom to the hand. The digits each include a first, second, third, and fourth phalange. A first joint operatively connects the first phalange to the second phalange such that the second phalange is selectively rotatable with respect to the first phalange about a first axis. A second joint operatively connects the second phalange to the third phalange such that the third phalange is selectively rotatable with respect to the second phalange about a second axis. A third joint operatively connects the third phalange to the fourth phalange such that the fourth phalange is selectively rotatable with respect to the third phalange about a third axis.

The digits include a first finger, a second finger, a third finger, and a thumb. Each of the fingers are operatively attached to the base structure at the respective first phalange. The first phalange of the thumb is pivotably attached to the base structure and a base axis is defined therebetween. The first phalange of the thumb is configured to selectively rotate relative to the base structure about the base axis. The base axis extends in generally perpendicular relationship to the first, second, and third axis of the thumb.

The above features and advantages and other features and advantages of the present teachings are readily apparent from the following detailed description of the best modes for carrying out the present teachings when taken in connection with the accompanying drawings.

DESCRIPTION OF THE PREFERRED EMBODIMENT

Figure 1:
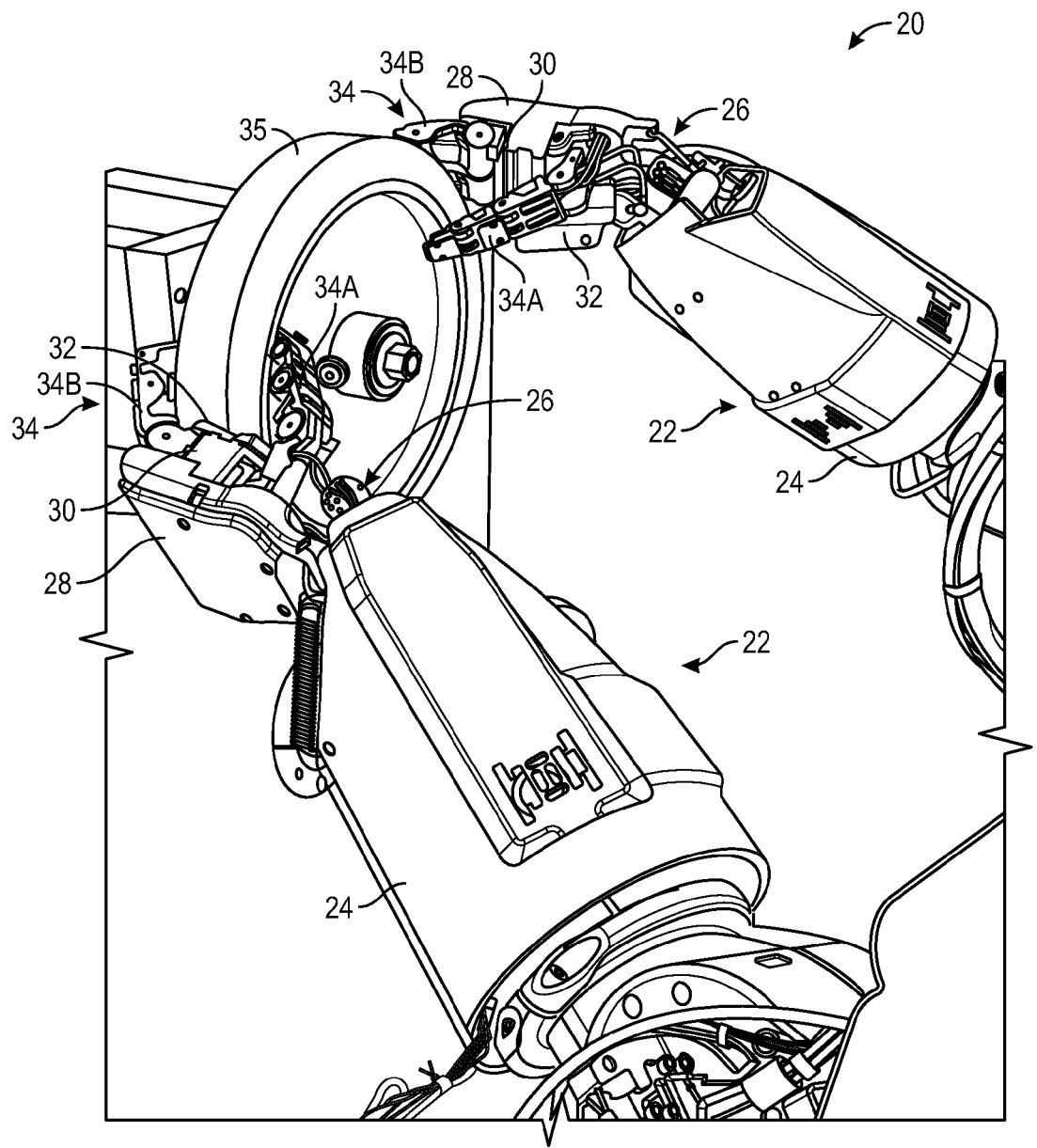
FIG. 1 is a schematic perspective illustration of a robot having two lower arm assemblies.

With reference to the drawings where in like reference numbers refer to the same or similar components throughout the several views, FIGS. 1 and 2 show a robot 20 having a pair of lower robotic arms 22, adapted to perform one or more tasks with multiple degrees of freedom (DOF). More specifically, as explained in more detail below, the lower robotic arm 22 is configured to control at least thirteen DOF.

Figure 9:
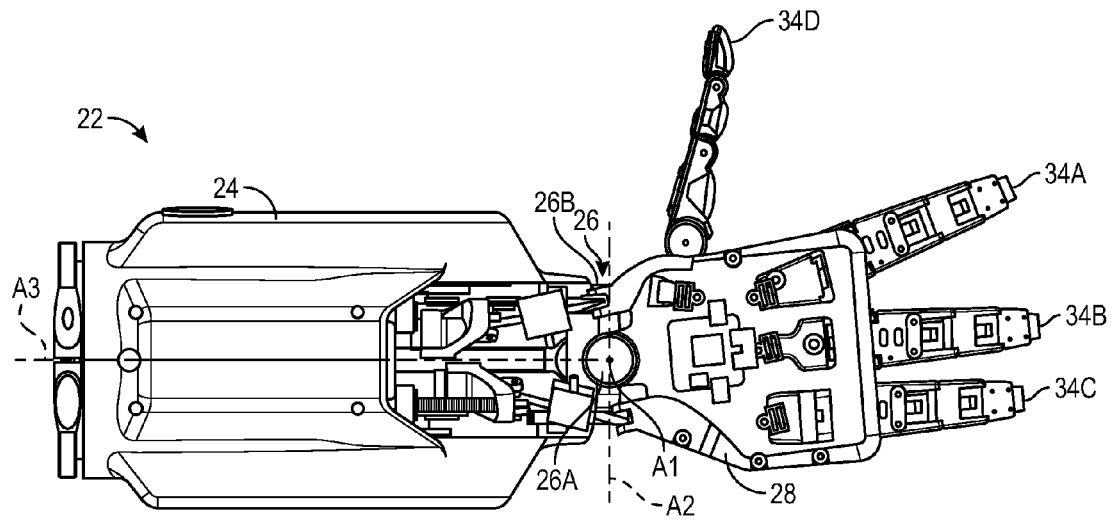
FIG. 9 is a dorsal view of the lower robotic arm.
Figure 10:
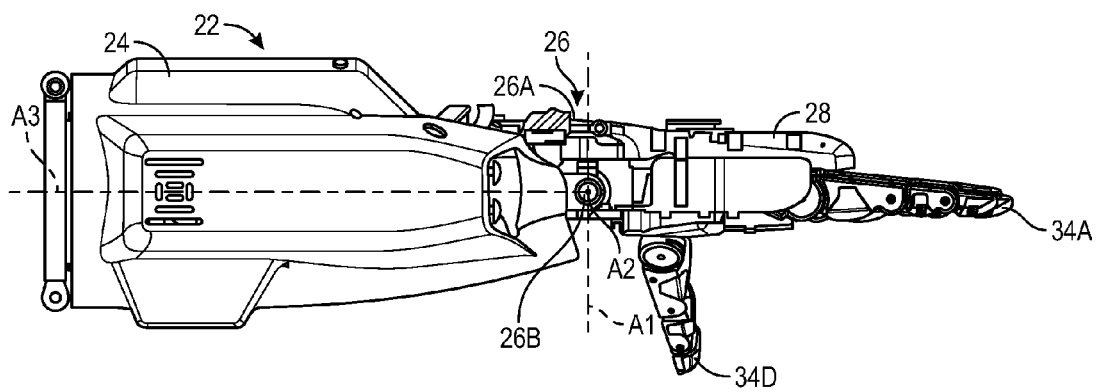
FIG. 10 is a side view of the lower robotic arm.

Each lower robotic arm 22 includes a forearm 24, a wrist joint assembly 26, and a hand 28. The wrist joint assembly 26 operatively interconnects the hand 28 and the forearm 24. The hand 28 includes a base structure 30 that defines a palm 32 of the hand 28. A plurality of digits 34 are movably mounted to the base structure 30 and are each configured to selectively curl toward the palm 32 in order to grasp an object 35. The forearm 24 includes a plurality actuators configured for selectively moving the digits 34, as explained in more detail below. With reference to FIGS. 9 and 10, the forearm 24 may be configured to rotate or "twist" (roll) about a rolling axis of rotation A3.

With continued reference to FIGS. 9 and 10, the wrist joint assembly 26 is configured to allow the hand 28 to move relative to the forearm 24. The wrist joint assembly 26 includes a first wrist joint 26A and a second wrist joint 26B. Each wrist joint 26A, 26B may be a rotary joint, where the first wrist joint 26A is pivotable about a first axis of rotation A1 and the second wrist joint 26B is pivotable about a second axis of rotation A2. The first wrist joint 26A is configured to allow "side to side" (yaw) motion about the first axis of rotation A1 and the second wrist joint 26B is configured to allow "up and down" (pitch) motion about the second axis of rotation A2. Therefore, to provide this motion, the first axis of rotation A1 and the second axis of rotation A2 may extend in generally perpendicular relationship to one another. Further, with continued reference to FIGS. 9 and 10, the first and second axes of rotation A1, A2 may intersect one another.

Figure 2A:
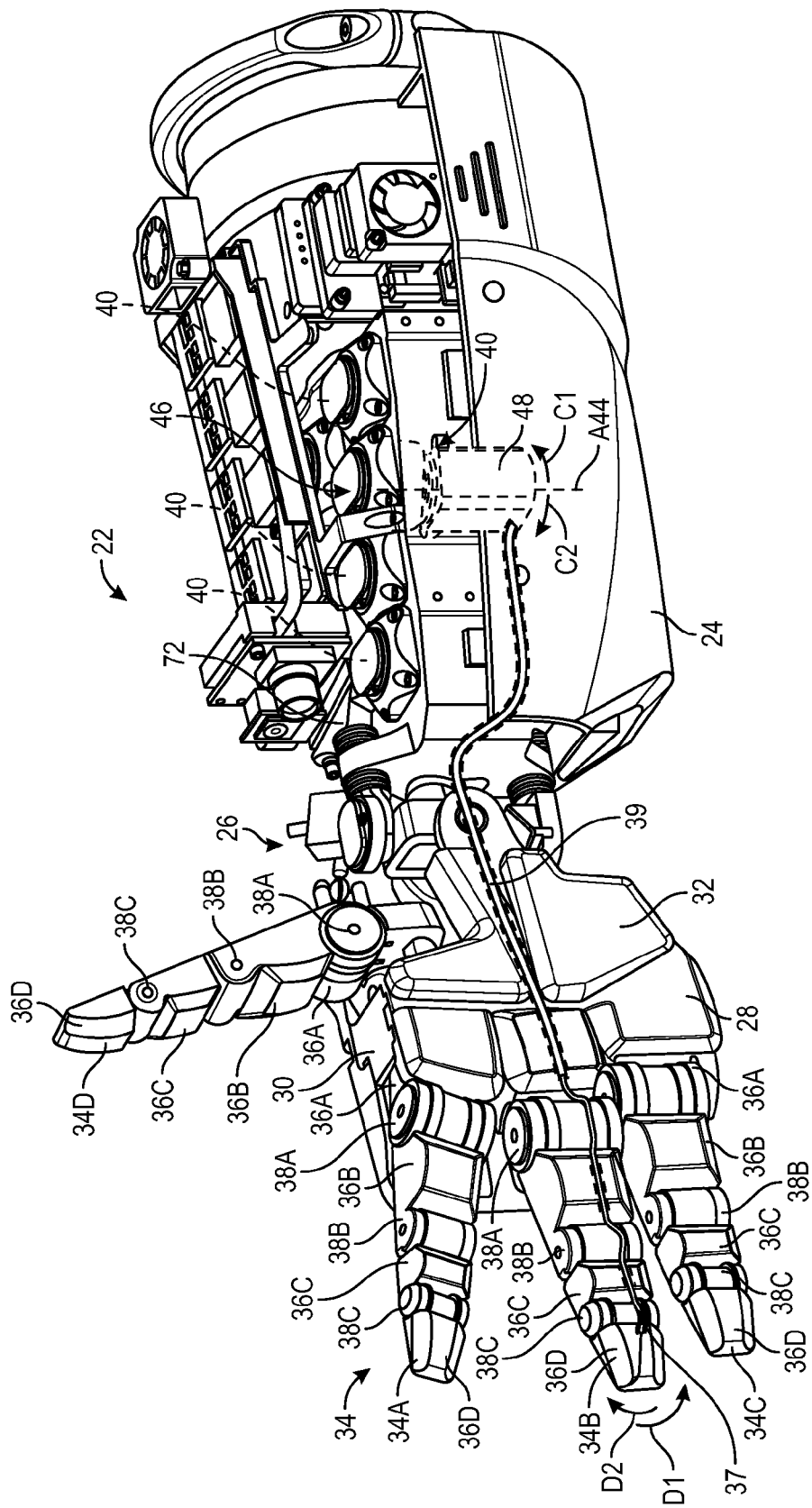
FIG. 2A is a schematic perspective illustration of the lower arm assembly for the robot of FIG. 1, wherein the lower arm assembly includes a hand, a forearm, a wrist joint assembly, and a plurality of first rotary actuators disposed in the forearm.
Figure 2B:
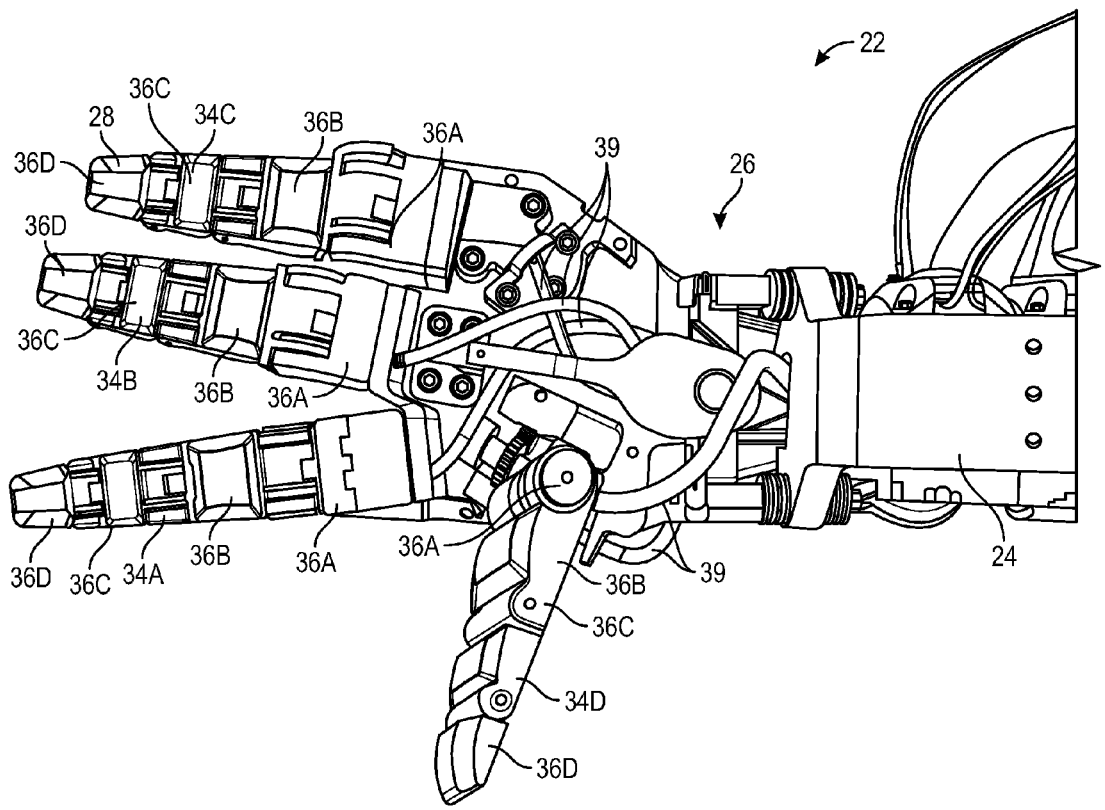
FIG. 2B is a schematic perspective view of the lower arm assembly, wherein the lower arm assembly includes a plurality of tendons.
Figure 3:
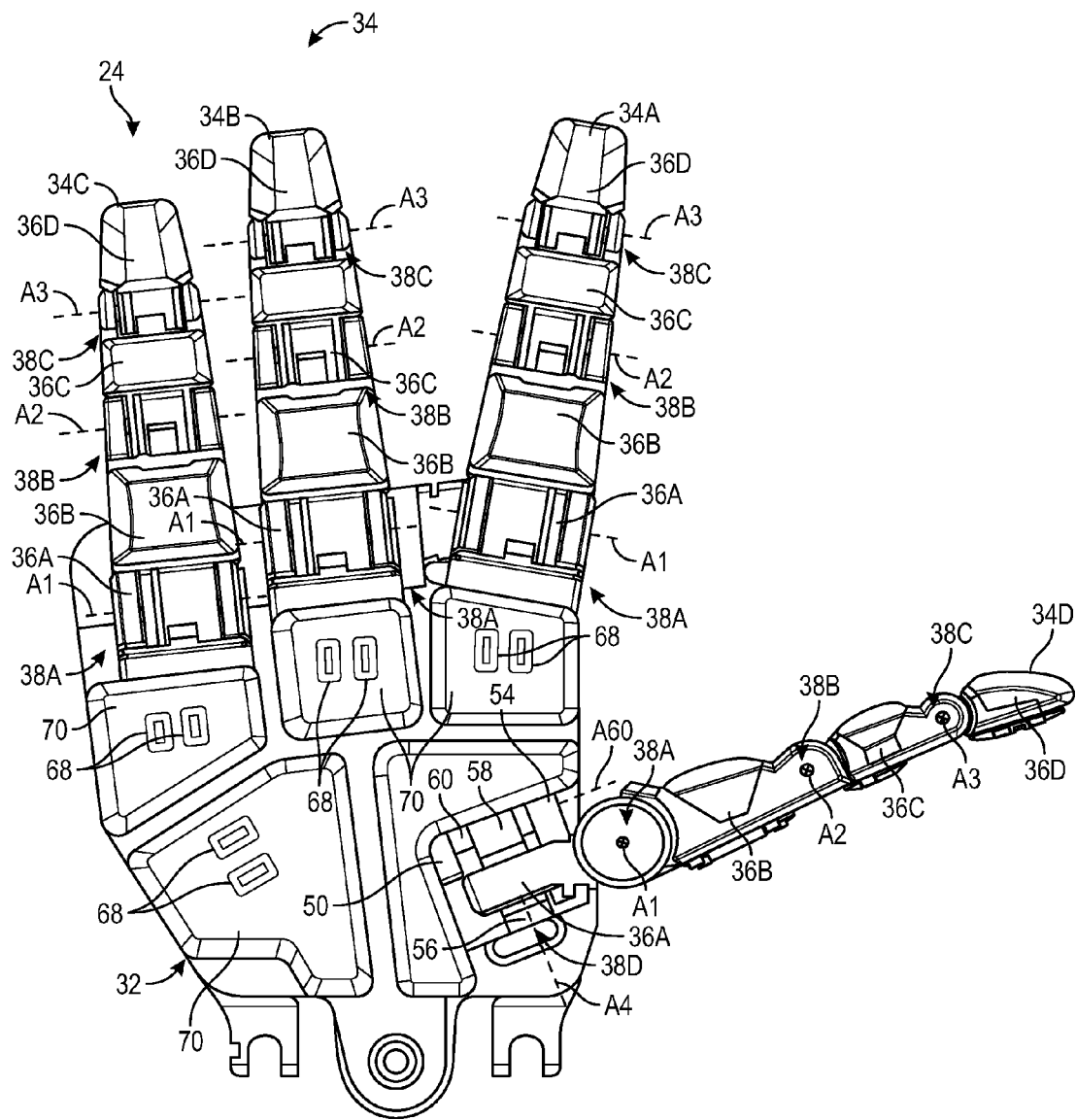
FIG. 3 is a front view of a palm of the hand having a plurality of digits.

With reference to FIGS. 2A and 3, the digits 34 may include a plurality of fingers 34A-C and a thumb 34D. The fingers 34A-C may include three fingers, i.e., a first finger 34A, a second finger 34B, and a third finger 34C. The first finger 34A corresponds in position, and in function, to a human index finger. More specifically the first finger 34A is disposed adjacent the thumb 34D and the second finger 34B, or middle finger. The third finger 34C corresponds in position and function to a human pinky finger. More specifically, the second finger 34B is disposed between the first finger 34A and the third finger 34C. It should be appreciated that more or less fingers may be used. The thumb 34D is disposed adjacent the first finger 34A, opposite the third finger 34C.

Each digit 34 is segmented into a plurality of phalanges 36A-D, or links. More specifically, the phalanges 36A-D include a first phalange 36A, a second phalange 36B, a third phalange 36C, and a fourth phalange 36D. For each digit 34, the first phalange 36A is operatively attached to the base structure 30, the second phalange 36B operatively extends from the respective first phalange 36A, the third phalange 36C operatively extends from the respective second phalange 36B, and the fourth phalange 36D operatively extends from the respective third phalange 36C. In one non-limiting example, each phalange 36A-D may be formed from aluminum. Alternatively, by way of another non-limiting example, each phalange 36A-D may be formed from a thermoplastic, such as polyetherimide (PEI), and the like.

Figure 4A:
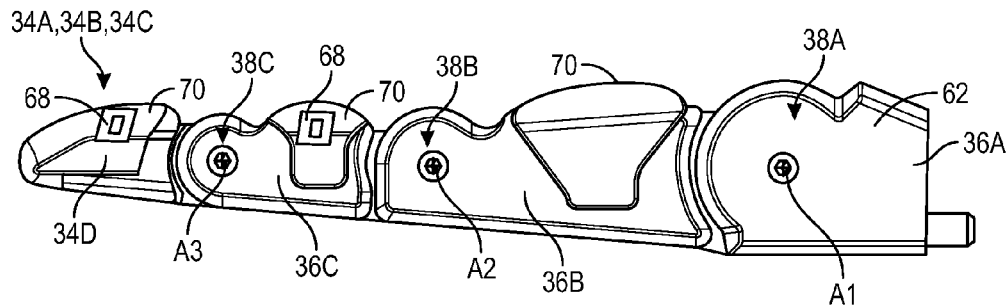
FIG. 4A is a side view of one of the digits of the hand of FIG. 3.
Figure 4G:
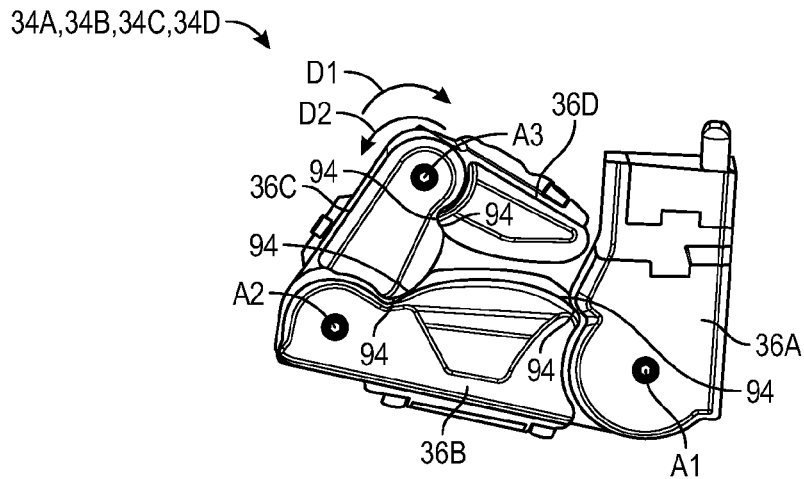
FIG. 4G is a side view of one of the digits in a closed position.
Figure 4H:
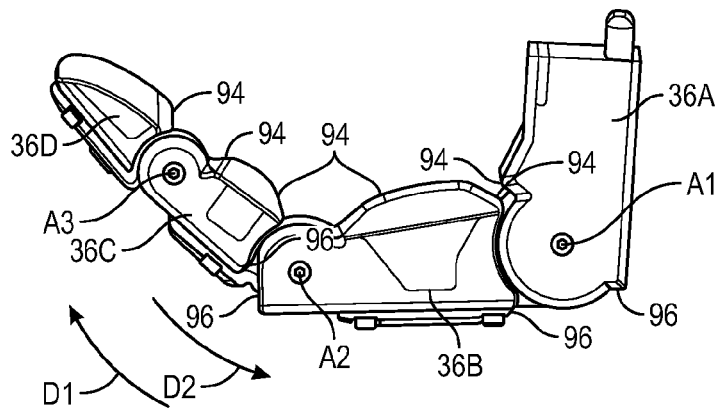
FIG. 4H is a side view of one of the digits in a partially extended position
Figure 4I:
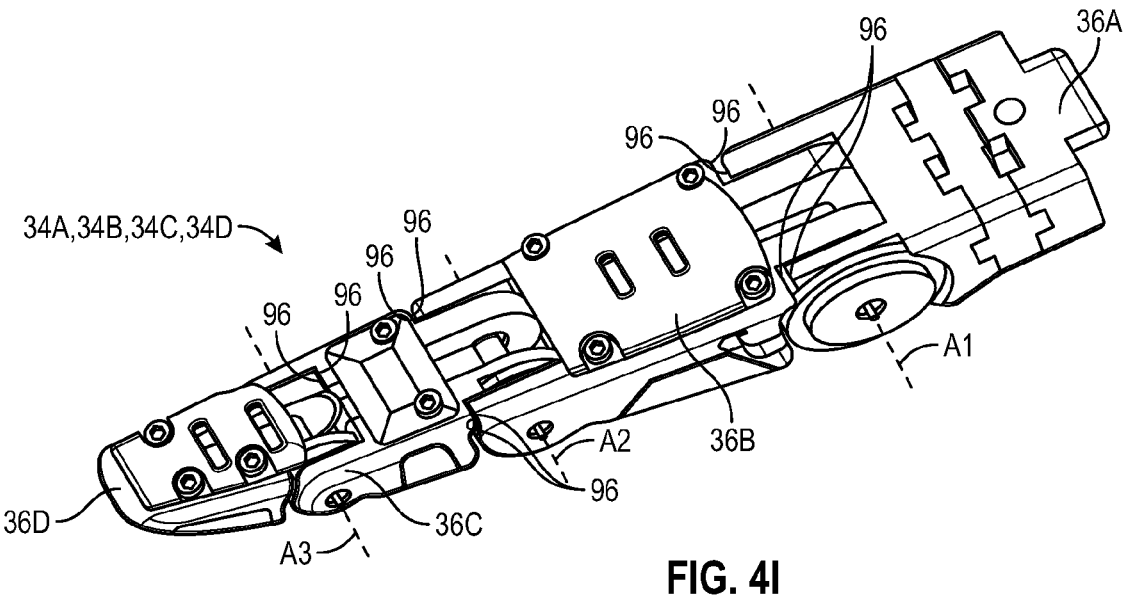
FIG. 4I is a side perspective view of one of the digits in a fully extended position.
Figure 5:
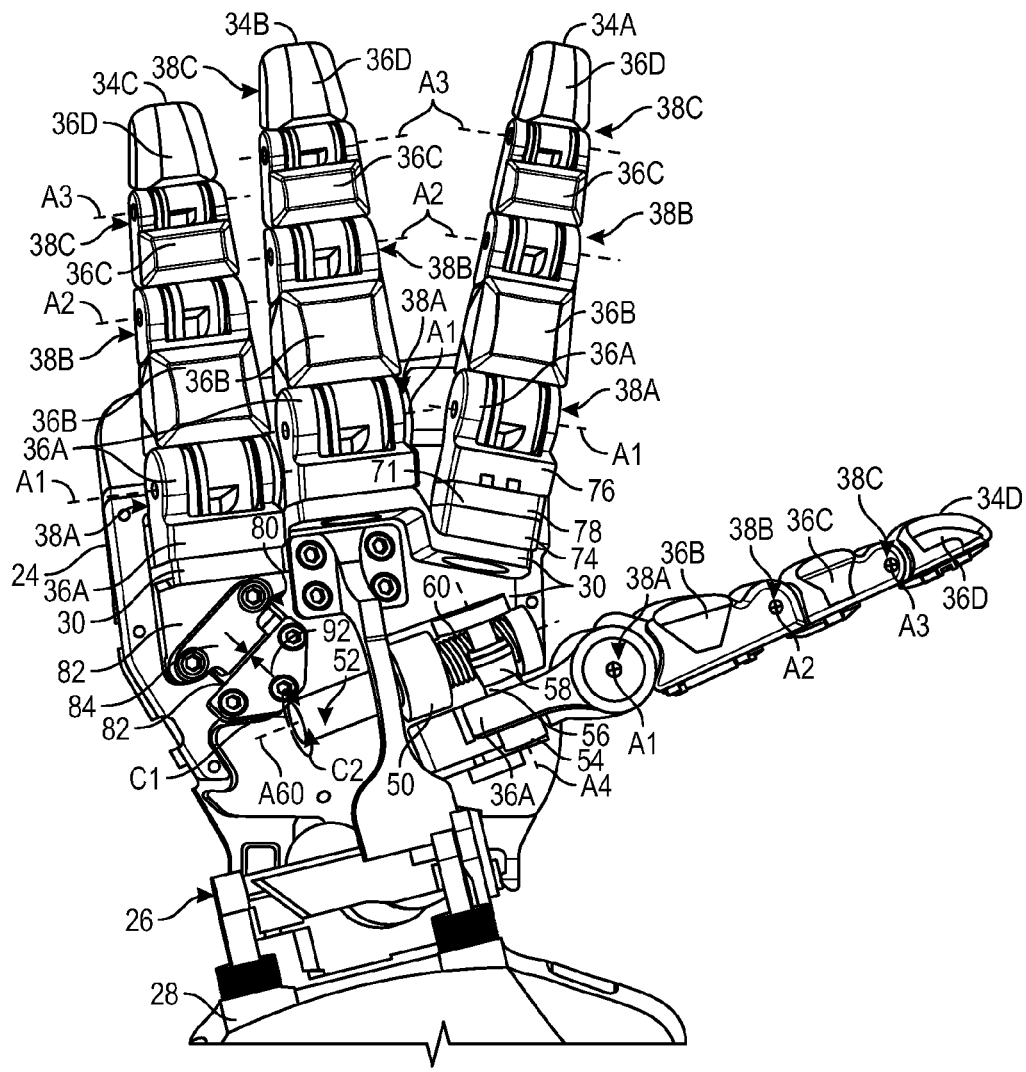
FIG. 5 is a front view of the base structure of the hand.

Referring to FIGS. 3 and 5, for each digit 34, the first, second, third, and fourth phalanges 36A-D are operatively interconnected with one another to provide three joints 38A-C. As such, for each digit 34, a first joint 38A is defined between the first phalange 36A and the second phalange 36B; a second joint 38B is defined between the second phalange 36B and the third phalange 36C; and a third joint 38C is defined between the third phalange 36C and the fourth phalange 36D. As such, each first joint 38A pivots about a first axis A1, each second joint 38B pivots about a second axis A2, and each third joint 38C pivots about a third axis A3. With continued reference to FIGS. 3 and 5, for each digit 34, the first, second, and third axes A1-A3 may extend in spaced and generally parallel relationship to one another. The digits 34A-D are configured to pivot about the axes A1-A3 to move between a closed position, as illustrated by the digit 34A-D shown in FIG. 4G, a partially extended position, as illustrated by the digit 34A-D shown in FIG. 4H, and an extended position, as illustrated by the digit 34A-D shown in FIG. 4I.

The first phalange 36A of each finger 34A-C extends from the base structure 30, as shown in FIGS. 3, 4A-D, and 5. With respect to the thumb 34D, as shown in FIGS. 3 and 5, the first phalange 36A is pivotally attached to the base structure 30, such that a pivot joint 38D is defined therebetween. As such, the pivot joint 38D pivots about a base axis A4. The base axis A4 extends in generally perpendicular relationship to the first, second, and third axes A1-A3 of the thumb 34D.

Referring to FIGS. 2A-B and 2D-E, movement of the phalanges 36A-D about the joints 38A-C is accomplished by robotic tendons 37, i.e., flexible members such as cables. Each tendon 37 is operatively connected, at one end thereof, to a respective first rotary actuator 40. As will be explained in more detail below, each of the first rotary actuators 40 is configured to convert the rotary motion of a motor 41 into linear motion. Further, the other end of each tendon 37 is operatively attached to the respective phalange 36D. A plurality of conduits 39 are operatively disposed in the lower robotic arm 22 such that each conduit 39 operatively extends between a respective one of the first rotary actuators 40 and a respective one of the first phalanges 36A. The conduits 39 are flexibly rigid and define a hollow interior (not shown). The conduits 39 are a tube that is bendable and used to maintain tension within the length of the tendon when the hand 28 pivots relative to the forearm 24, about the wrist joint assembly 26. The conduits 39 may be formed from steel. It should be appreciated, however, the conduits 39 may also be formed from any other material so long at the conduit 39 is flexibly rigid. The tendons 37 are routed through the hollow interior of the respective conduits 39. As such, the rigidity of each of the conduits 39 provides support to the otherwise flexible conduit routed through the hollow interior. The conduits 39 are configured to flex and bend as the hand 28 moves with respect to the forearm 24.

Figure 7:
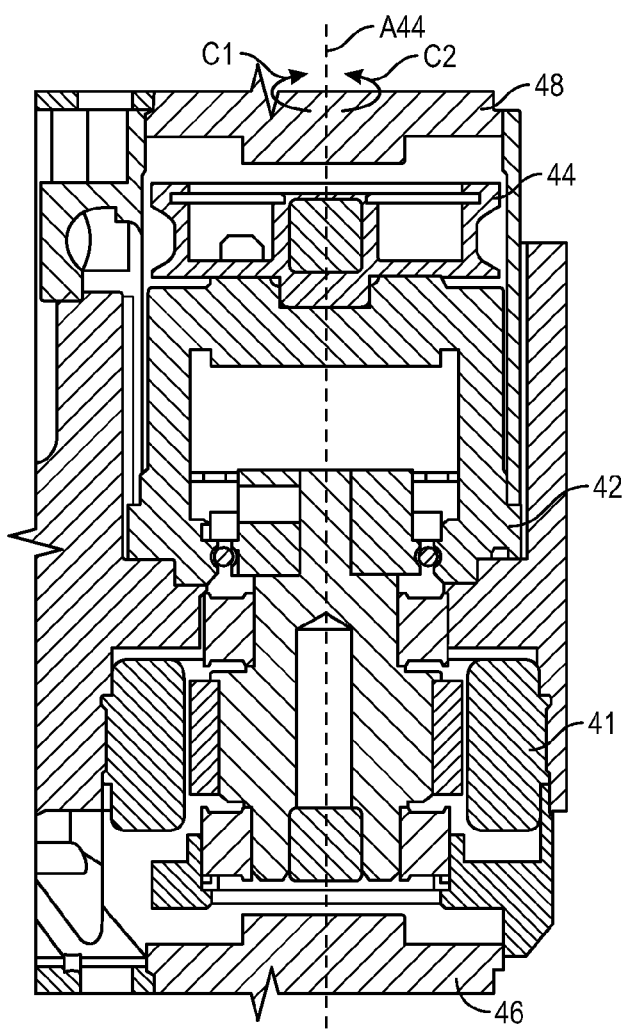
FIG. 7 is a schematic cross-sectional side view of a first rotary actuator of FIG. 2A.

Referring to FIG. 2A, each lower robotic arm 22 includes a plurality of the first rotary actuators 40. The first rotary actuators 40 are operatively disposed in the forearm 24. Each first rotary actuator 40 may correspond to a respective one of the digits 34A-D. Therefore, there may be four first rotary actuators 40 operatively disposed in the forearm 40. It should be appreciated that multiple first actuators may be used to drive a digit 34. Referring now to FIG. 7, each first rotary actuator 40 may include a motor 41 and a spindle 44. The motor may have a gear box 42 configured to provide a gear reduction. By way of a non-limiting example, the gear reduction may be 100 to 1 (100:1). It should be appreciated that other gear ratios may be used, as known to those of skill in the art. The spindle 44 rotatably extends from the gear box 42 and is configured to rotate about an axis of rotation A44 in a first direction C1 or a second direction C2, opposite the first direction C1, in response to operation of the motor 41. The motor 41 may be a brushless motor. The first rotary actuator 40 may include a commutation encoder 46 that can be configured to establish an initial absolute rotary position of the spindle 44, prior to starting the motor 42, in addition to providing commutation control and feedback of the motor 42. The commutation encoder 46 may be a 9 bit encoder. The first rotary actuator 40 may also include another encoder 48, configured to determine an absolute rotational position of the spindle 44 during operation. By way of a non-limiting example, the encoder may be a 13 bit encoder.

Referring again to FIG. 2A, the one end of the tendon 37 is operatively attached to the spindle 44 of the respective first rotary actuator 40, while the other end of the tendon 37 is operatively attached to a phalange 36 of the respective digit 34. In one non-limiting example, the tendon 37 may be attached to the fourth phalange 36D of the respective digit 34. When one or more of the first rotary actuators 40 receives a signal to close, or otherwise retract, the respective digit 34, the motor 42 turns in the first direction C1 to wind the tendon 37 about the spindle 44. As the tendon 37 is wound about the spindle 44, the corresponding phalange 36 is pulled in a first direction D1, toward the palm 32 of the hand 28. Likewise, when one or more of the first rotary actuators 40 receives a signal to open, or otherwise extend, the respective digit 34 in a second direction D2, away from the palm 32, the motor 42 turns in the second direction C2 to unwind the tendon 37 from the spindle 44. The encoder 48 is configured to provide the absolute position of the respective digit 34, as a function of the rotational position of the spindle 44 and the number of revolutions the spindle has rotated in the direction C1 or C2 of rotation about the A44. This positional information allows the digits 34 to selectively be partially or fully retracted or extended.

Additionally, the conduit 39 is configured to impart rigidity to the respective tendon 37, as the tendon 37 is wound and unwound from the spindle 44. As such, the tendon 37 is routed through the hollow interior of the respective conduit 39 such that the tendon 37 is protected as the wrist 26 moves the hand 28 with respect to the forearm 24 without collapsing onto itself to extend the respective phalange 36. Each tendon 37 may be formed to have a sufficiently small diameter, so as to be discreetly packaged within the lower robotic arm 22. By way of a non-limiting example, each tendon 37 may be a diameter of up to 0.08 inches. It should be appreciated that the diameter of each tendon 37 may be other sizes as well. Each tendon 37 may be formed from any material suitable to provide sufficient tensile strength to pull the fourth phalange 36D toward the palm. By way of a non-limiting example, the tendons 37 may be formed from woven fibers. The fibers may include natural, polymeric, and the like.

The tendons 37 are configured to curl and uncurl the respective digits 34A-D, as a function of selectively actuating the respective first rotary actuator 40 by applying tension to the respective digit 34A-D. In a non-limiting example, when tension is applied to any of the tendons 37, and the tendon 37 is operatively attached to the fourth phalange 36D, the corresponding fourth phalange 36D rotates in a first direction D1 about the third axis A3, i.e., toward the palm 32. As the fourth phalange 36D begins to rotate, the third and second phalanges 36C, 36B are also caused to rotate and curl, in cascading fashion. More specifically, third phalange 36C rotates in the first direction D1 about the second axis A2 and the second phalange 36B rotates in the first direction D1 about the first axis A1. As such, the second, third, and fourth phalanges 36D, 36C, 36B are each caused to curl toward the palm 32.

With reference to FIG. 5, a second rotary actuator 50 may operatively interconnect the first phalange 36A of the thumb 34D and the base structure 30. The second rotary actuator 50 may be operatively attached to the base structure 30. The second rotary actuator 50 may include a motor 52, a worm 60, a worm gear 58, and a shaft 56. The motor 52 may be selectively operated to rotate the worm 60 about a drive axis A60. The worm 60 is disposed in meshing relationship with the worm gear 58. The worm gear 58 is operatively attached to the shaft 56 that is, in turn, operatively attached to the first phalange 36A of the thumb 34D. The worm gear 58 is selectively rotated about the base axis A4 in a first direction C1 or a second direction C2, opposite the first direction C1 in response to rotation of the worm 60 about the drive axis A60. The shaft 56, which also extends along the base axis A4, rotates with the worm gear 58 about the base axis A4 that, in turn, causes the thumb 34D to rotate about the base axis A4, with the connection of the first phalange 36A to the shaft 56. The encoder 46, 48 may be configured for determining a rotational position of the first phalange 36A about the base axis A4.

Referring again to FIG. 3, the palm 32 of the hand 38 includes a plurality of touch sensors 68. Likewise, referring to FIG. 4B, each of the phalanges 36A-D includes at least one touch sensor 68. Each of the phalanges 36A-D may include a plurality of the touch sensors 68. Each touch sensor 68 is a device configured to measure information arising from physical interaction with the environment. The touch sensor 68 may be configured to sense the force used by the hand 28 to grasp the object 35. Each touch sensor 68 may be encased in a pad 70. The touch sensor 68 and the pad 70 may be co-molded onto the respective phalange 36A-D or palm 32 of the hand 38. The pads 70 are configured to be sufficiently compressible such that when the object 35 is grasped, the pads 70 compress to actuate the touch sensor 68. By way of a non-limiting example, the pads 70 may be comprised of a material having a 70 Shore A hardness. However, it should be appreciated that pads 70 having other hardnesses may also be used. The pads 70 may be comprised of rubber, such as polyurethane rubber and the like. The pad 70 may have a thickness sufficiently thick to encase the touch sensor 68 therein. By way of a non-limiting example, the pad 70 may have a thickness of approximately 3.5 millimeters.

Figure 4B:
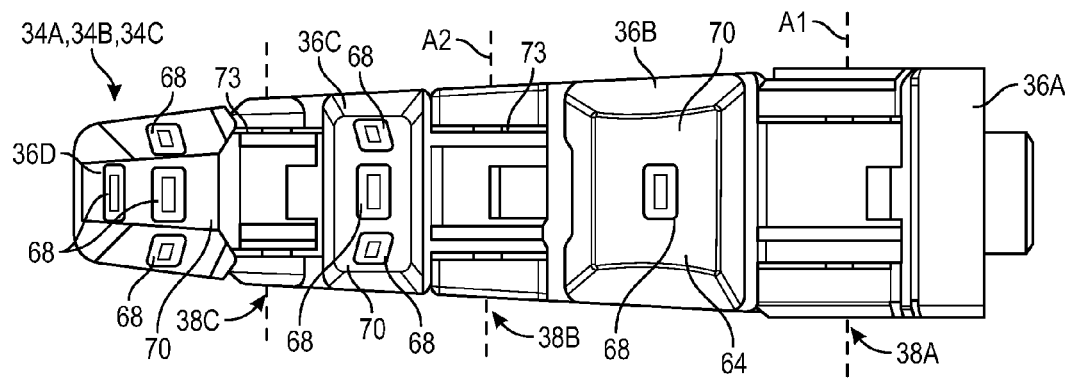
FIG. 4B is a front view of one of the digits of the hand.
Figure 4C:
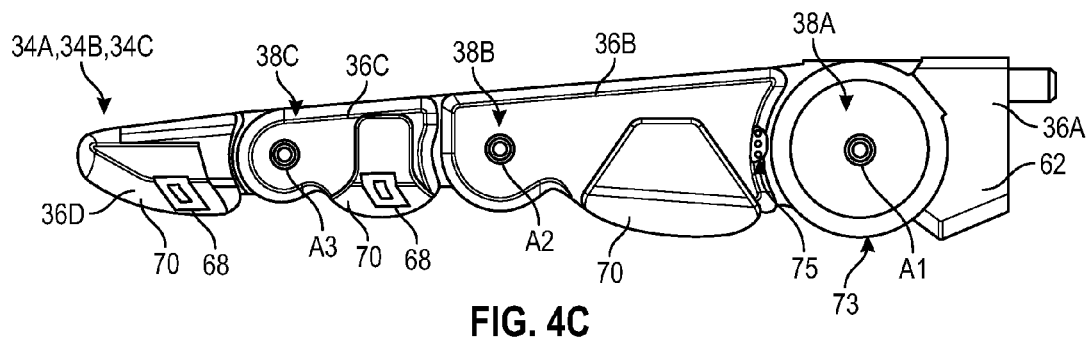
FIG. 4C is another side view of one of the digits of the hand of FIG. 3.
Figure 4D:
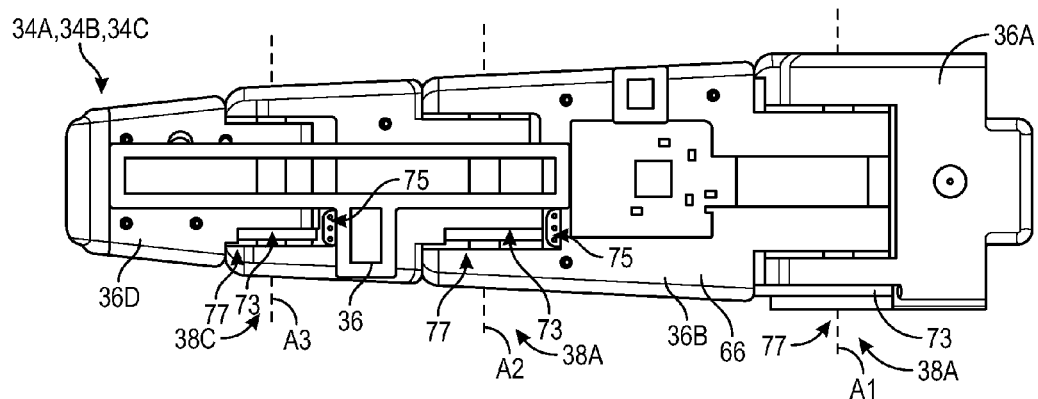
FIG. 4D is a back/dorsal view of one of the digits of the hand of FIG. 3.

Referring now to FIGS. 4B and 4D, each joint 38A-C may include a positional sensor 77. By way of a non-limiting example, each positional sensor 77 may be a magnet 73 and Hall effect sensor 75. Each positional sensor 77 is configured to measure the absolute position of the respective joint 38A-C.

FIG. 2A shows a camera 72 is disposed in the forearm. The camera 72 is configured to view the hand 28, including the digits 34A-D and/or the palm 32, to determine the proximity of the hand 28 to the object 35. The camera may be a three dimensional (3D) camera.

Referring now to FIGS. 4A-D, the fingers 34A-C are shown. FIGS. 4A and 4C show opposing sides 62 of the fingers 34A-C. FIG. 4B shows a gripping side 64 and FIG. 4D shows an outer side 66, opposite the gripping side 64.

Figure 2C:
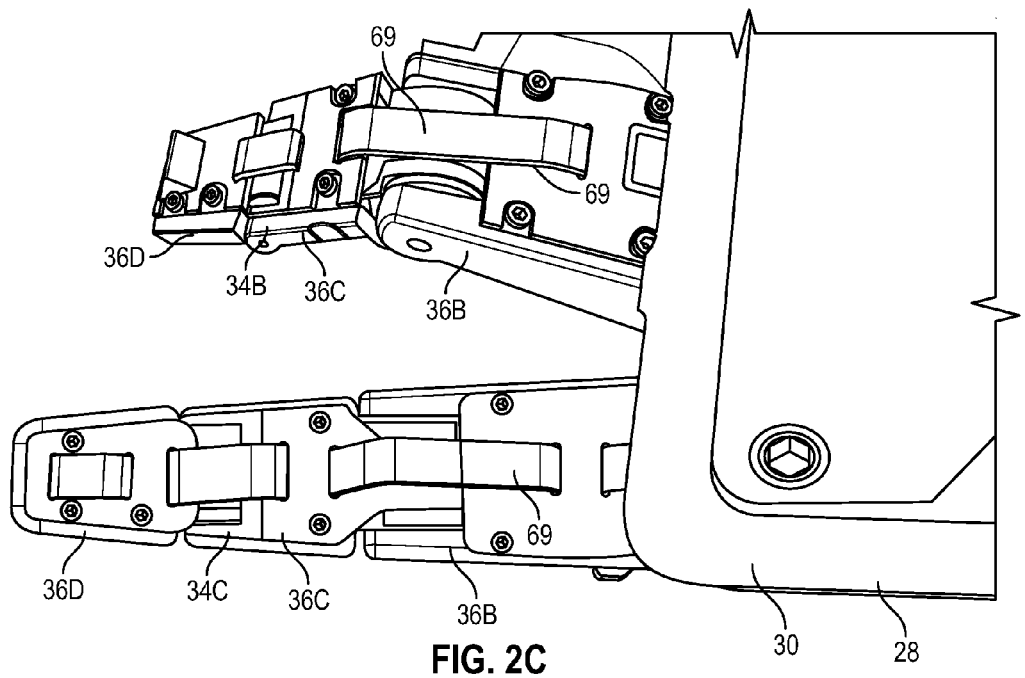
FIG. 2C is a dorsal view of two digits of the hand.
Figure 2D:
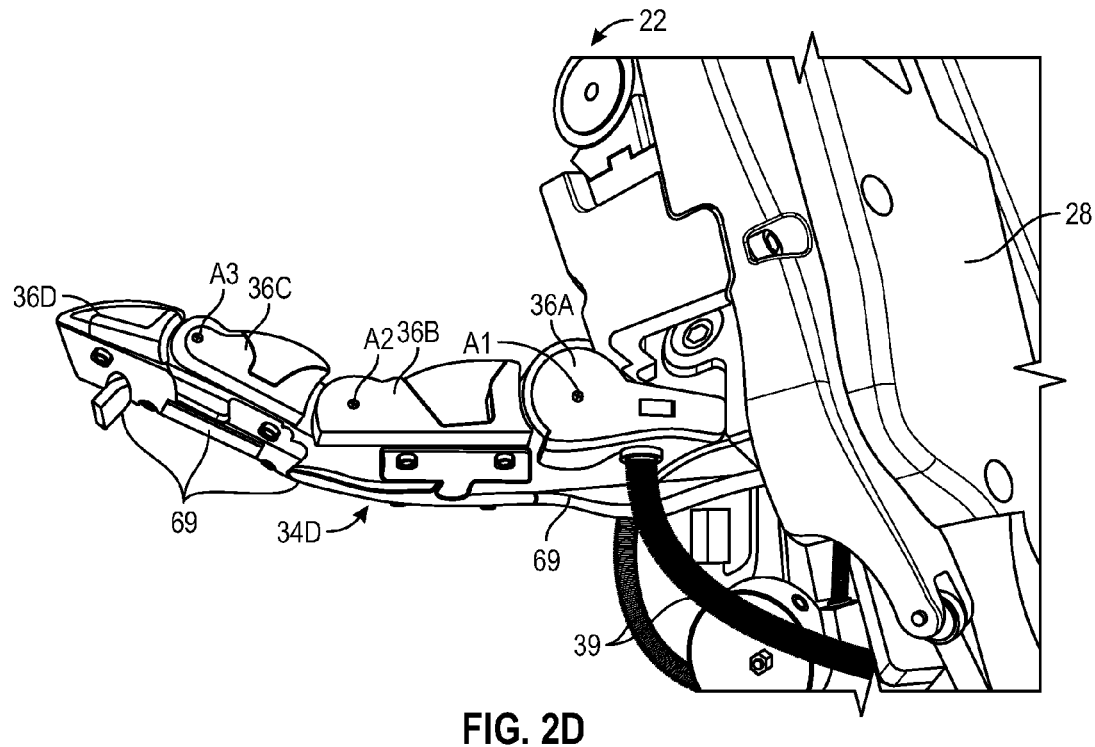
FIG. 2D is a perspective side view of a thumb of the hand.
Figure 2E:
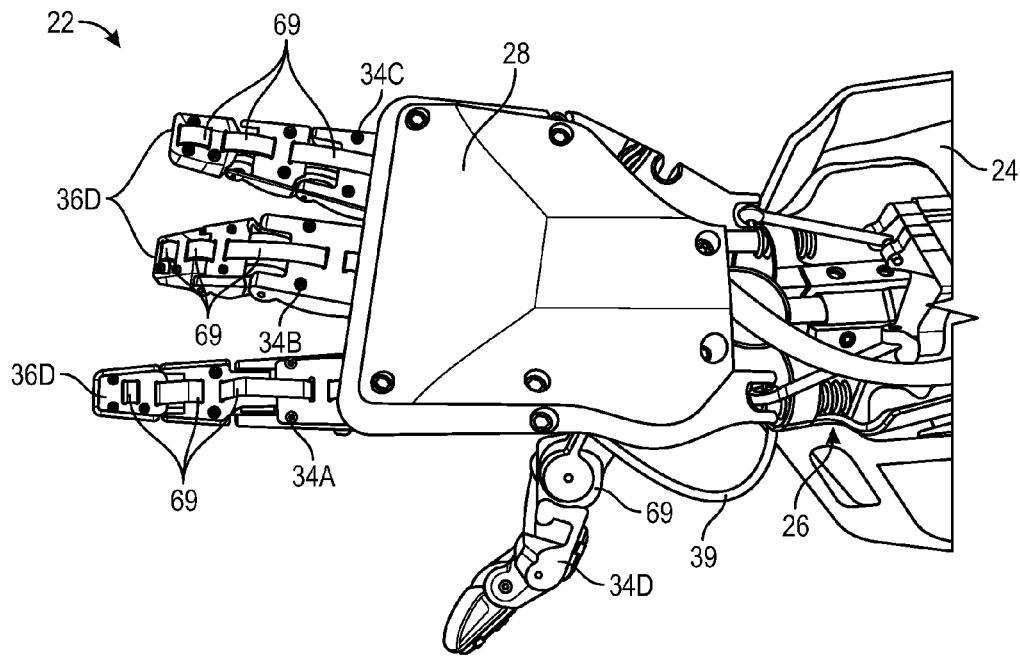
FIG. 2E is a dorsal view of the hand.

Referring now to FIGS. 2C-2E, a plurality of elastic bands 69 are operatively disposed along the dorsal side of the hand 28, opposite the tendons 37, which are disposed on the palm 32 side of the hand 28. More specifically, an elastic band 69 corresponds to each of the digits 34A-D. Therefore, there may be four elastic bands 69. One of the elastic bands 69 may operatively extend between the base structure 30 or the first phalange 36A and the fourth phalange 36D. Each elastic band 69 may be operatively attached to each of the second, third, and fourth phalange 36B-D, and can be pre-tensioned to match operating requirements. It should be appreciated that the pre-tension of the band 69 can be adjusted across all or selective phalanges 36. When one or more phalanges 36A-D of one of the digits 34A-D is rotated toward the palm 32, the corresponding elastic band 69 increases in tension. As such, the digit 34A-D is configured to move away from the palm 32 as tension is decreased in a respective first rotary actuator 40 by virtue of the tension within the elastic band 69. Tension is reduced in the first rotary actuator 40 when one or more of the first rotary actuators 40 receives a signal to open, or otherwise extend, the respective digit 34, the motor 42 turns in the second direction C2 to unwind the tendon 37 about the spindle 44. As the tendon 37 is unwound from the spindle 44, the corresponding phalange 36 is pulled in a second direction, away from the palm 32 of the hand 28 by virtue of the tension in the respective elastic band 69.

While a single elastic band 69 is shown for each digit 34A-D, it should be appreciated that springs may also be used. Additionally, a plurality of elastic bands, springs, and/or combinations thereof may be used for each digit 34A-D. By way of a non-limiting example, a spring may be disposed to operatively connect adjacent phalanges 36A-D to one another. As such, each digit 34A-D would have three springs disposed on the dorsal side.

Referring again to FIG. 4H, the digit 34A-D is shown to be in a partially extended position. Any position of the digit 34A-D between the open position, shown in FIG. 4I, and the closed position, shown in FIG. 4G, is achieved by the balance of tension in the tendon 37 and the elastic band 69.

Figure 4E:
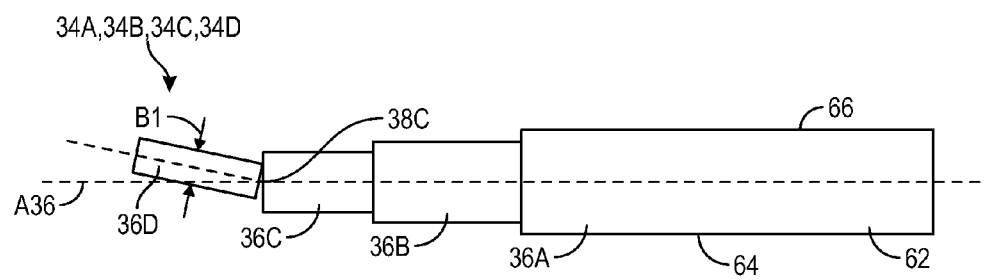
FIG. 4E is a schematic side view of one of the digits of the hand, illustrating an overextension of a fourth phalange of the digit.
Figure 4F:
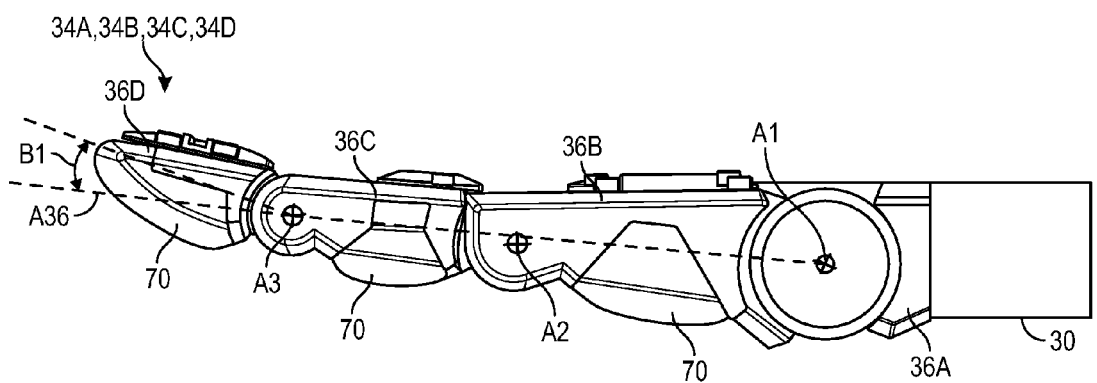
FIG. 4F is another schematic side view of one of the digits of the hand, illustrating an overextension of the fourth phalange of the digit.

Referring now to FIGS. 4E-F, a side view of the digit 34A-D is schematically illustrated. As illustrated, the fourth phalange 36D is pivotally attached to the third phalange 36C at the third joint 38C. The fourth phalange 36D is configured to be overextended from a neutral axis A36. The neutral axis A36 extends through the first, second, third, and fourth phalanges 36A-D when the first, second, third, and fourth phalanges 36A-D are aligned with one another in a neutral, i.e., unbent, position. By way of a non-limiting example, the fourth phalange 36D is configured to be overextended an angle B1, relative to the neutral axis A36, by up to 10 degrees. Such an overextension is configured to assist in picking up the object 35 (shown in FIG. 1) by bending, thus allowing the fourth phalange 36D to bend to accommodate the object 35 when the object 35 is grasped. As such, overextension of the fourth phalange 36D allows the object 35 to be picked up easily. It should be appreciated that the fourth phalange 36D may be configured to overextend by other angles as well.

Figure 8:
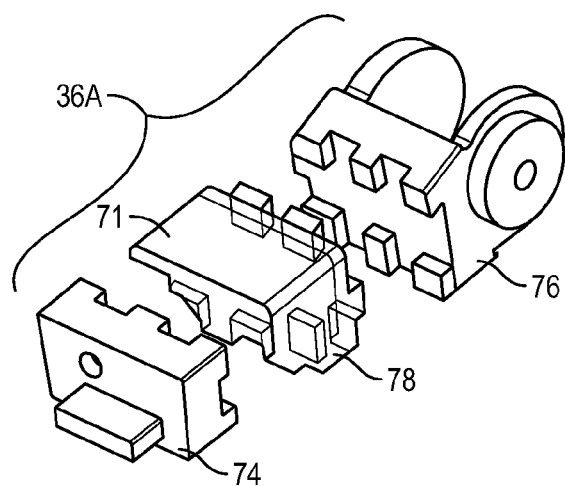
FIG. 8 is a schematic exploded perspective side view of a first phalange having a first portion, a second portion, and a flexible portion between the first portion and the second portion.

In order to provide additional flexibility when grasping the object 35, FIG. 8 illustrates a flexible joint 71 disposed within the first phalange 36A of the first finger 34A. More specifically, the first phalange 36A of the first finger 34A includes a first portion 74 and a second portion 76, with a flexible portion 78 disposed between the first portion 74 and the second portion 76. The first portion 74 is operatively attached to the base structure 30. The second portion 76 is pivotally attached to the second phalange 36B, at the first joint 38A. The first portion 74, the flexible portion 78, and the second portion 76 may be co-molded to form a unitary structure. The first portion 74 and the second portion 76 may be formed from aluminum. Alternatively, by way of another non-limiting example, the first portion 74 and the second portion 76 may include thermoplastic, such as PEI, and the like. The flexible portion 78 is formed from an elastic material configured to provide flexibility between the first portion 74 and the second portion 76. By way of a non-limiting example, the flexible portion 78 may include synthetic rubber and the like.

Figure 6:
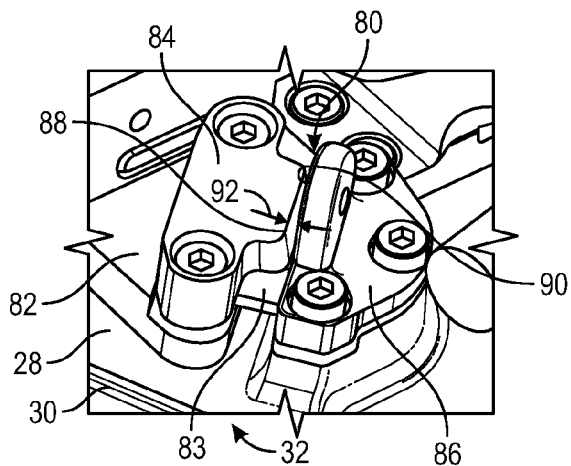
FIG. 6 is a front perspective view of a palm joint defined between a third digit and the base structure of the hand of FIG. 5.

Referring to FIGS. 5 and 6, the third finger 34C flexibly extends from the base structure 30 at a palm joint 80. More specifically, the first phalange 36A is rigidly connected to a base plate 82. A first clamp 84 is operatively secured to the base plate 82, with a spring plate 83 sandwiched therebetween. Additionally, a second clamp 86 operatively secures the spring plate 83 to the base structure 30 such that the first clamp 84 is operatively disposed between the first phalange 36A and the second clamp 86. The first clamp 84 includes a first surface 88, facing the second clamp 86. Likewise, the second clamp 86 includes a second surface 90 extending opposite the base plate 82, in spaced relationship to the first surface 88 to define a gap 92 therebetween. The spring plate 83 is configured to flex in the span of the gap 92 defined between the first surface 88 and the second surface 90 such that the third finger 34C pivots relative to the base structure 30 and the second clamp 86, at the palm joint 80. The gap 92 is sized such that the first surface 88 contacts the second surface 90 to stop, or otherwise limit, the rotation of the third finger 34C relative to the base structure 30 and the second clamp 86. The spring plate 83 is formed from a material configured to provide sufficient flexibility and rigidity, such as steel. It should be appreciated that other materials may also be used, as known to those of skill in the art.

Referring again to FIG. 4I, the phalanges 36A-D include a plurality of open contact surfaces 96. The open contact surfaces 96 are configured to act as "hard stops" between adjacent phalanges 36A-D when the digit 34A-D is in the closed position. Referring now to FIG. 4G, the phalanges include a plurality of open contact surfaces 94. As with the closed position, the open contact surfaces 94 act as hard stops between adjacent phalanges 36AD when the digit 34A-D is in the open position.

While the best modes for carrying out the disclosure have been described in detail, those familiar with the art to which this invention relates will recognize various alternative designs and embodiments for practicing the invention within the scope of the appended claims

The invention claimed is:

1. A lower robotic arm comprising:
a base structure;
a plurality of digits, each having first, second, third, and fourth phalanges;
wherein the plurality of digits includes a thumb, a first finger, a second finger, and a third finger;
wherein a first joint operatively connects the first phalange to the second phalange such that the second phalange is selectively rotatable with respect to the first phalange about a first axis;
wherein a second joint operatively connects the second phalange to the third phalange such that the third phalange is selectively rotatable with respect to the second phalange about a second axis;
wherein a third joint operatively connects the third phalange to the fourth phalange such that the fourth phalange is selectively rotatable with respect to the third phalange about a third axis; and
a plurality of tendons, each operatively connected at one end to a respective fourth phalange;
wherein each of the plurality of tendons is configured to selectively apply a first torque to the respective fourth phalange to urge the fourth phalange to rotate in a first direction about the third axis, relative to the respective third phalange;
wherein the first phalange of the first finger includes a first portion, a second portion, and a flexible portion, wherein the flexible portion is operatively disposed between the first portion and the second portion;
wherein the first portion is operatively attached to the base structure and the second portion is pivotally attached to the second phalange at the first joint; and
wherein the flexible portion is configured to allow the first portion and the second portion to flex relative to one another.

2. The lower robotic arm, as set forth in claim 1, wherein each of the plurality of tendons is configured to selectively sequentially apply a first torque to each of the respective fourth phalange and the third phalange to urge the respective fourth phalange to rotate in a first direction about the third axis, relative to the respective third phalange, and to urge the respective third phalange in the first direction about the second axis, relative to the respective second phalange.

3. The lower robotic arm, as set forth in claim 2, wherein each of the plurality of tendons is configured to selectively sequentially apply a first torque to each of the respective fourth phalange, the third phalange, and the second phalange to urge the respective fourth phalange to rotate in a first direction about the third axis, relative to the respective third phalange, to urge the respective third phalange in the first direction about the second axis, relative to the respective second phalange, and to urge the respective second phalange in the first direction about the first axis, relative to the respective first phalange.

4. The lower robotic arm, as set forth in claim 1, further comprising a plurality of first rotary actuators, operatively disposed in spaced relationship to the fourth phalanges of the digits;
wherein each rotary actuator includes a spindle configured to rotate about an axis of rotation;
wherein each tendon is operatively connected to a respective one of the plurality of spindles and the respective fourth phalange at opposite ends, such that rotation of the respective spindle about the axis of rotation, in a first direction, winds the respective tendon about the spindle to thereby apply the first torque to the respective fourth phalange; and
wherein rotation of the respective spindle about the axis of rotation, in a second direction, opposite the first direction, unwinds the respective tendon from the spindle to reduce the first torque applied to the respective fourth phalange.

5. The lower robotic arm, as set forth in claim 4, further comprising a forearm;
wherein each of the first rotary actuators are operatively disposed in the forearm.

6. A lower robotic arm, as set forth in claim 5, further comprising a camera operatively disposed in the forearm;
wherein the camera is configured for viewing the plurality of digits and objects grasped by the plurality of digits.

7. The lower robotic arm, as set forth in claim 1, further comprising a second rotary actuator operatively interconnecting the first phalange of the thumb and the base structure, such that the first phalange of the thumb is selectively rotatable relative to the base structure about a base axis; and
wherein the base axis extends in generally perpendicular relationship to the first, second, and third axis of the thumb.

8. The lower robotic arm, as set forth in claim 1, wherein the first phalange of the third finger is rigidly connected to a base plate;
wherein a first clamp is operatively secured to the base plate, with a spring plate sandwiched between the first clamp and the base plate;
wherein a second clamp operatively secures the spring plate to the base structure such that the first clamp is operatively disposed between the first phalange and the second clamp;
wherein the first clamp includes a first edge facing the second clamp;
wherein the second clamp includes a second edge extending opposite the base plate, in spaced relationship to the first edge, to define a gap therebetween; and
wherein the spring plate is configured to flex within the span gap defined between the first edge and the second edge, such that the third finger pivots relative to each of the base structure and the second clamp, at a palm joint.

9. The lower robotic arm, as set forth in claim 8, wherein the gap is sized such that the first edge contacts the second edge to stop the rotation of the third finger relative to the base structure and the second clamp.

10. A lower robotic arm, as set forth in claim 1, further comprising at least one touch sensor operatively disposed on at least one of the first, second, third, and fourth phalanges and the base structure;
wherein the at least one touch sensor is configured to sense a force imparted thereto.

11. A lower robotic arm, as set forth in claim 1, further comprising a plurality of positional sensors;
wherein one of the plurality of position sensors is operatively disposed at each of the respective first, second, and third joints and each of the plurality of phalanges of each of the plurality of digits; and
wherein each positional sensor is configured to measure the absolute position of the respective first, second, and third joint.

12. A lower robotic arm, as set forth in claim 1, further comprising a plurality of elastic bands, each operatively connected to a respective one of the fourth phalanges;
wherein each of the plurality of elastic bands is configured to apply a second torque to the respective fourth phalange to urge the fourth phalange to rotate in a second direction about the third axis, opposite the first direction, relative to the respective third phalange; and wherein the respective fourth phalange is configured to rotate in the second direction about the third axis, relative to the respective third phalange, when the second torque is greater than the first torque.

13. A lower robotic arm comprising:

a forearm;

a wrist joint assembly, operatively connected to the forearm; and a hand, operatively connected to the wrist joint assembly, such that the wrist joint assembly is configured to allow movement of the hand relative to the forearm, wherein the hand includes:
a base structure;
a plurality of digits, each having first, second, third, and fourth phalanges;
wherein a first joint operatively connects the first phalange to the second phalange such that the second phalange is selectively rotatable with respect to the first phalange about a first axis;
wherein a second joint operatively connects the second phalange to the third phalange such that the third phalange is selectively rotatable with respect to the second phalange about a second axis;
wherein a third joint operatively connects the third phalange to the fourth phalange such that the fourth phalange is selectively rotatable with respect to the third phalange about a third axis;
wherein the plurality of digits include a first finger, a second finger, a third finger, and a thumb;
wherein each of the first, second, and third fingers is operatively attached to the base structure at the respective first phalange;
wherein the first phalange of the thumb is pivotably attached to the base structure and a base axis is defined therebetween, such that the first phalange of the thumb is configured to selectively rotate relative to the base structure about the base axis; and
wherein the base axis extends in generally perpendicular relationship to the first, second, and third axis of the thumb;
wherein the first phalange of the third finger is rigidly connected to a base plate;
wherein a first clamp is operatively secured to the base plate, with a spring plate sandwiched between the first clamp and the base plate;
wherein a second clamp operatively secures the spring plate to the base structure such that the first clamp is operatively disposed between the first phalange and the second clamp;
wherein the first clamp includes a first edge facing the second clamp;
wherein the second clamp includes a second edge extending opposite the base plate, in spaced relationship to the first edge, to define a gap therebetween; and
wherein the spring plate is configured to flex within the span gap defined between the first edge and the second edge, such that the third finger pivots relative to each of the base structure and the second clamp, at a palm joint.

14. A lower robotic arm, as set forth in claim 13, further comprising a camera operatively disposed in the forearm; wherein the camera is configured for viewing the hand.

15. A lower robotic arm, as set forth in claim 13, further comprising at least one touch sensor operatively disposed on at least one of the first, second, third, and fourth phalanges and the base structure;
wherein the at least one touch sensor is configured to sense a force imparted thereto.

16. A lower robotic arm, as set forth in claim 13, further comprising a plurality of positional sensors;
wherein one of the plurality of position sensors is operatively disposed at each of the respective first, second, and third joints and each of the plurality of digits of each of the plurality of digits; and
wherein each positional sensor is configured to measure the absolute position of the respective first, second, and third joint.

17. A lower robotic arm comprising:

a base structure;

a plurality of digits, each having first, second, third, and fourth phalanges;

wherein the plurality of digits includes a thumb, a first finger, a second finger, and a third finger;

wherein a first joint operatively connects the first phalange to the second phalange such that the second phalange is selectively rotatable with respect to the first phalange about a first axis;

wherein a second joint operatively connects the second phalange to the third phalange such that the third phalange is selectively rotatable with respect to the second phalange about a second axis;

wherein a third joint operatively connects the third phalange to the fourth phalange such that the fourth phalange is selectively rotatable with respect to the third phalange about a third axis; and a plurality of tendons, each operatively connected at one end to a respective fourth phalange;

wherein each of the plurality of tendons is configured to selectively apply a first torque to the respective fourth phalange to urge the fourth phalange to rotate in a first direction about the third axis, relative to the respective third phalange;

wherein the first phalange of the third finger is rigidly connected to a base plate;

wherein a first clamp is operatively secured to the base plate, with a spring plate sandwiched between the first clamp and the base plate;

wherein a second clamp operatively secures the spring plate to the base structure such that the first clamp is operatively disposed between the first phalange and the second clamp;

wherein the first clamp includes a first edge facing the second clamp;

wherein the second clamp includes a second edge extending opposite the base plate, in spaced relationship to the first edge, to define a gap therebetween; and wherein the spring plate is configured to flex within the span gap defined between the first edge and the second edge, such that the third finger pivots relative to each of the base structure and the second clamp, at a palm joint.

18. The lower robotic arm, as set forth in claim 17, wherein each of the plurality of tendons is configured to selectively sequentially apply a first torque to each of the respective fourth phalange and the third phalange to urge the respective fourth phalange to rotate in a first direction about the third axis, relative to the respective third phalange, and to urge the respective third phalange in the first direction about the second axis, relative to the respective second phalange.

19. The lower robotic arm, as set forth in claim 18, wherein each of the plurality of tendons is configured to selectively sequentially apply a first torque to each of the respective fourth phalange, the third phalange, and the second phalange to urge the respective fourth phalange to rotate in a first direction about the third axis, relative to the respective third phalange, to urge the respective third phalange in the first direction about the second axis, relative to the respective second phalange, and to urge the respective second phalange in the first direction about the first axis, relative to the respective first phalange.

20. The lower robotic arm, as set forth in claim 17, further comprising a plurality of first rotary actuators, operatively disposed in spaced relationship to the fourth phalanges of the digits;

wherein each rotary actuator includes a spindle configured to rotate about an axis of rotation;

wherein each tendon is operatively connected to a respective one of the plurality of spindles and the respective fourth phalange at opposite ends, such that rotation of the respective spindle about the axis of rotation, in a first direction, winds the respective tendon about the spindle to thereby apply the first torque to the respective fourth phalange; and wherein rotation of the respective spindle about the axis of rotation, in a second direction, opposite the first direction, unwinds the respective tendon from the spindle to reduce the first torque applied to the respective fourth phalange.

\* \* \* \* \*